US011270238B2

(12) United States Patent
Whitman et al.

(10) Patent No.: US 11,270,238 B2
(45) Date of Patent: Mar. 8, 2022

(54) UTILIZING BLOCKCHAIN TECHNOLOGY WITH MOBILE ROBOTIC MACHINES

(71) Applicant: Kyndryl, Inc., New York, NY (US)

(72) Inventors: Todd Russell Whitman, Bethany, CT (US); Johannes Jaco Liebenberg, Sandton (ZA); Guillaume Hoareau, Batiment (FR)

(73) Assignee: Kyndryl, Inc., New York, NY (US)

( * ) Notice: Subject to any disclaimer, the term of this patent is extended or adjusted under 35 U.S.C. 154(b) by 334 days.

(21) Appl. No.: 16/259,136

(22) Filed: Jan. 28, 2019

(65) Prior Publication Data

US 2020/0242538 A1 Jul. 30, 2020

(51) Int. Cl.
*G06Q 10/06* (2012.01)
*G06Q 10/08* (2012.01)
(Continued)

(52) U.S. Cl.
CPC . *G06Q 10/063114* (2013.01); *G06Q 10/0838* (2013.01); *H04L 9/0637* (2013.01);
(Continued)

(58) Field of Classification Search
CPC ........... G05B 2219/39001; G05B 2219/34456; H04L 9/3263; H04L 9/0637; H04L 63/0823; H04L 2209/38
See application file for complete search history.

(56) References Cited

U.S. PATENT DOCUMENTS 9,457,468 B1 * 10/2016 Elazary .................. B25J 9/161
9,731,821 B2    8/2017 Hoareau et al.
(Continued)

FOREIGN PATENT DOCUMENTS

WO   WO-2016160593 A1 * 10/2016 ........... H04L 63/126
WO   WO2017027648 A1    2/2017
(Continued)

OTHER PUBLICATIONS

Andreas Antonopoulos, Mastering Bitcoin (O'Reilly Early Release 2014) (Year: 2014).*
(Continued)

*Primary Examiner* — Jacob C. Coppola
(74) *Attorney, Agent, or Firm* — Yee & Associates, P.C.

(57) ABSTRACT

Utilizing blockchain ledgers with mobile robotic machines is provided. A first digital certificate is assigned to a requesting entity. The first digital certificate identifies the requesting entity within a network. A request is generated for performance of a task by a mobile robotic machine. Generating the request includes: requesting the mobile robotic machine to perform the task; receiving an acceptance of the task from the mobile robotic machine; and assigning a second digital certificate to the mobile robotic machine. The second digital certificate is signed using the first digital certificate and indicates that the mobile robotic machine is authorized to perform the task. A public key of the second digital certificate is posted to member entities of the network where other member entities responsible for an item corresponding to the task are able to use the public key to confirm authorization of the mobile robotic machine to perform the task.

15 Claims, 8 Drawing Sheets

(51) Int. Cl.
*H04L 9/32* (2006.01)
*H04L 9/06* (2006.01)
*H04L 29/06* (2006.01)

(52) U.S. Cl.
CPC ........ *H04L 9/3263* (2013.01); *H04L 63/0823* (2013.01); *G05B 2219/34456* (2013.01); *G05B 2219/39001* (2013.01); *H04L 2209/38* (2013.01)

(56) References Cited

U.S. PATENT DOCUMENTS

| | | | |
|---|---|---|---|
| 10,715,312 B2* | 7/2020 | Sundaresan et al. | H04L 9/06 |
| 11,066,164 B1* | 7/2021 | Tsong | H04L 9/3247 |
| 2016/0121487 A1* | 5/2016 | Mohan | H04L 67/34 700/248 |
| 2016/0283920 A1 | 9/2016 | Fisher et al. | |
| 2017/0012964 A1* | 1/2017 | Ceppi | H04L 63/0807 |
| 2017/0285633 A1 | 10/2017 | Poornachandran et al. | |
| 2018/0144298 A1 | 5/2018 | Rankin | |
| 2018/0191714 A1* | 7/2018 | Jentzsch et al. | H04L 63/0869 |
| 2018/0202822 A1* | 7/2018 | DeLizio | G01C 21/34 |
| 2018/0248685 A1* | 8/2018 | O'Brien | H04L 63/0853 |
| 2020/0047337 A1* | 2/2020 | Williams | B25J 9/163 |
| 2020/0409357 A1* | 12/2020 | Bash | G08G 5/0034 |

FOREIGN PATENT DOCUMENTS

| | | | |
|---|---|---|---|
| WO | WO2018020377 A1 | 2/2018 | |
| WO | WO-2020086557 A1 * | 4/2020 | B25J 9/08 |

OTHER PUBLICATIONS

Christidis et al., "Blockchains and Smart Contracts for the Internet of Things," IEEE Access, vol. 4, May 10, 2016, pp. 2292-2303.

Green, "Driverless-Car Global Market Seen Reaching $42 Billion by 2025," Copyright 2019 Bloomberg L.P., 1 page. https://www.bloomberg.com/news/articles/2015-01-08/driverless-car-global-market-seen-reaching-42-billion-by-2025.

"10 million self-driving cars will be on the road by 2020," Business Insider Intelligence, BI Intelligence Jun. 15, 2016, Copyright 2019 Insider Inc., 4 pages. https://www.businessinsider.com/report-10-million-self-driving-cars-will-be-on-the-road-by-2020-2015-5-6.

Glanfield, "Is this the end of the white van man? Driverless delivery vehicles will be trialled on the streets of London next year," Daily Mail Online, Published Dec. 2015, 44 pages. http://www.dailymail.co.uk/news/article-3367720/Is-end-white-van-man-Driverless-delivery-vehiclestrialled-streets-London-year.html#ixzz3zeVL2rW4.

Bickmore et al., "Animated Autonomous Personal Representatives," Sep. 1999, 9 pages. https://www.researchgate.net/profile/Timothy_Bickmore/publication/2371315_Animated_Autonomous_Personal_Representatives/links/02e7e5320c9e92957c000000/Animated-Autonomous-Personal-Representatives.pdf?origin=publication_detail.

Morby, "Mercedes-Benz unveils prototype for drone-equipped delivery van," Sep. 9, 2016, 13 pages. https://www.dezeen.com/2016/09/09/mercedes-benz-vision-van-electric-drones-automated-prototype/.

* cited by examiner

UTILIZING BLOCKCHAIN TECHNOLOGY WITH MOBILE ROBOTIC MACHINES

BACKGROUND

1. Field

The disclosure relates generally to blockchain technology and more specifically to utilizing a distributed secure blockchain ledger to form a basis for allowing an autonomous mobile robotic machine to act as an authorized robotic agent of a requesting entity to a provider entity during performance of a task by the autonomous mobile robotic machine.

2. Description of the Related Art

A blockchain ledger exists as a shared and continuously reconciled database. The distribution and reconciliation of the database can be done automatically, by time, by some internal or extrinsic event, or by other criteria. In each case, a blockchain ledger is a continuously growing chain of data blocks, which are linked and secured using cryptography. Each block typically contains a cryptographic hash of the previous block in the blockchain, as well as a timestamp and data corresponding to an event, such as a financial transaction, operational event, or an output event often called a "smart contract". The cryptographic hash of the previous block in the current block, links the two blocks. The linked blocks form the blockchain ledger. Blocks are appended in chronological order. In other words, the last block in the chain is the most recent block. Further, blocks are immutable (i.e., cannot be changed or deleted).

By design, a blockchain ledger is resistant to modification of the data. For use as a distributed, decentralized ledger (i.e., not stored in just one central network node), a blockchain ledger is typically managed by a network of nodes collectively adhering to a protocol for validating new blocks. Each node connected to, or connecting to, the network receives a copy of the blockchain ledger, which is downloaded automatically. Once recorded, the data in any given block cannot be altered retroactively without the alteration of all subsequent blocks.

Thus, decentralized consensus is achieved using a blockchain ledger. This decentralized consensus makes blockchain ledgers suitable for recording, for example: events, identity management, financial transactions, document provenance, and the like. In addition, a blockchain ledger can assign rights because the blockchain ledger provides a record that compels offer and acceptance.

Blockchain-based smart contracts are computer-generated legal contracts that can be partially or fully executed or enforced without human interaction. In other words, a smart contract is a computer protocol that digitally facilitates, verifies, or enforces negotiation or performance of a contract. The blockchain-based smart contract is enabled by programming instructions that define and execute an agreement. The blockchain-based smart contract can write, record, or effect a financial or other transaction, and/or conduct a tangible, real world operation.

SUMMARY

According to one illustrative embodiment, a method for utilizing blockchain ledgers with mobile robotic machines is provided. A trusted entity assigns a first digital certificate to a requesting entity. The first digital certificate identifies the requesting entity within a network. The requesting entity generates a request for performance of a task by a mobile robotic machine. Generating the request includes: requesting the mobile robotic machine to perform the task; receiving an acceptance of the task from the mobile robotic machine; and assigning a second digital certificate to the mobile robotic machine. The second digital certificate is signed using the first digital certificate and indicates that the mobile robotic machine is authorized to perform the task by the requesting entity. A public key of the second digital certificate is posted to member entities of the network where other member entities responsible for an item corresponding to the task are able to use the public key to confirm authorization of the mobile robotic machine to perform the task as an agent for the requesting entity. According to other illustrative embodiments, a network data processing system and computer program product for utilizing blockchain ledgers with mobile robotic machines are provided.

DETAILED DESCRIPTION

Figure 1:
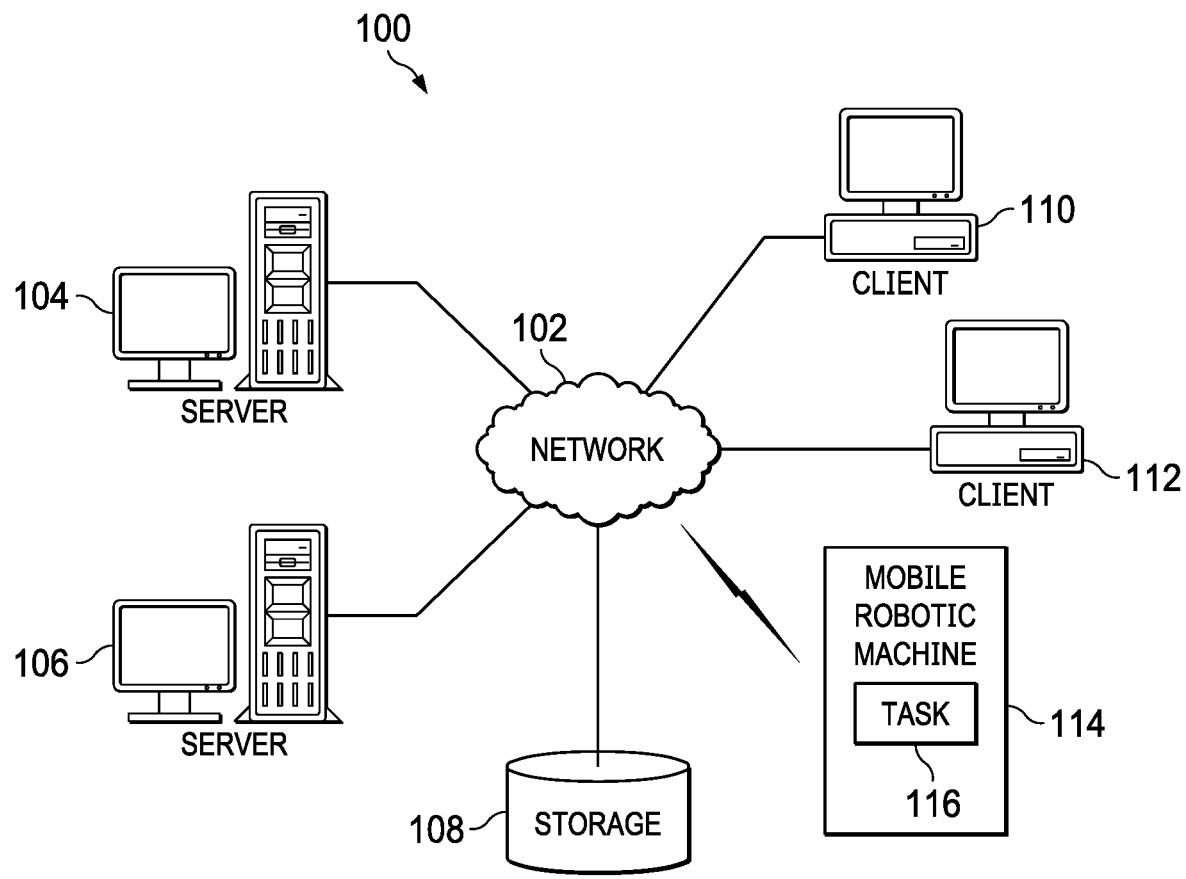
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
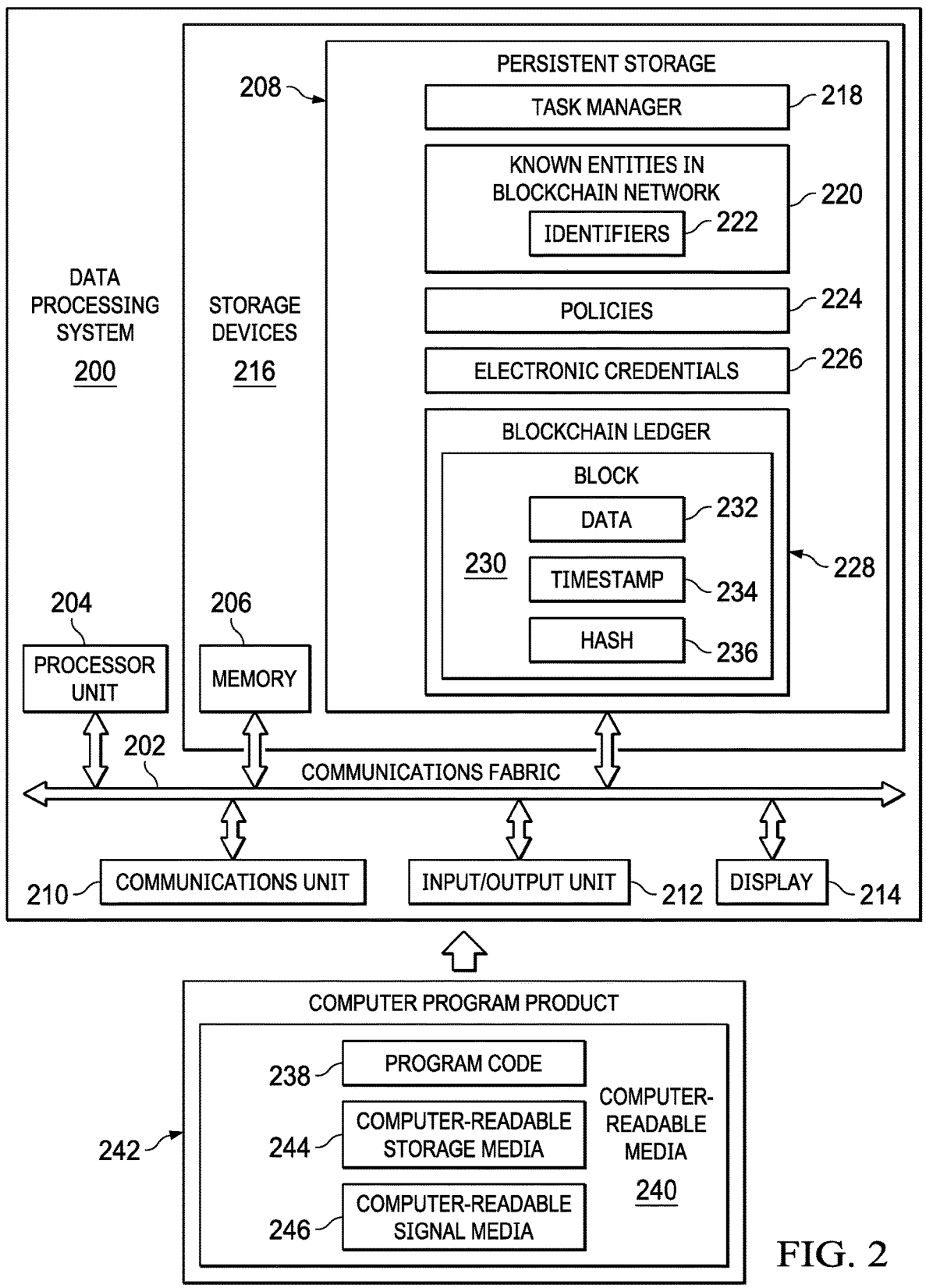
FIG. 2 is a diagram of a data processing system in which illustrative embodiments may be implemented.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, mobile robotic machines, and other devices in which the illustrative embodiments may be implemented. Network data processing system 100 contains network 102, which is the medium used to provide communications links between the computers, data processing systems, mobile robotic machines, and other devices connected together within network data processing system 100.

Network 102 may include connections, such as, for example, wire communication links, wireless communication links, and fiber optic cables. Further, network 102 may be a permissioned blockchain network with known identities of connected member entity data processing nodes. Furthermore, network 102 may also enable each member entity node connected to network 102 to automatically broadcast and share a blockchain ledger of cryptographically protected and chronologically ordered data with all other member entity nodes connected to network 102.

In the depicted example, server 104 and server 106 connect to network 102, along with storage 108. Server 104 and server 106 may be, for example, server computers with high-speed connections to network 102. In addition, server 104 and server 106 may correspond to one or more provider entities, which provide one or more goods and/or services to client member entities. A provider entity may be, for example, any type of business, enterprise, organization, institution, or agency that provides goods and/or services to a requesting client member entity. Goods may include, for example, merchandize, groceries, medication, products, and the like. Services may include, for example, transport services, such as taxi services, bus services, cargo services, and the like. Also, it should be noted that server 104 and server 106 may represent a plurality of different servers corresponding to a plurality of different provider entities. In addition, server 104 and server 106 may also provide information, such as software applications and programs, to other member entity nodes in network 102.

Client 110, client 112, and mobile robotic machine 114 also connect to network 102. Clients 110 and 112 are clients of server 104 and server 106. Clients 110 and 112 represent a plurality of client member nodes connected to network 102. In addition, clients 110 and 112 may correspond to requesting entities. A requesting entity may be, for example, a user, such as a person, who requests goods or services from provider entities corresponding to server 104 and server 106. In this example, clients 110 and 112 are shown as desktop or personal computers with wire communication links to network 102. However, it should be noted that clients 110 and 112 are examples only and may represent other types of data processing systems, such as, for example, laptop computers, handheld computers, smart phones, smart watches, smart televisions, smart appliances, gaming devices, kiosks, and the like.

Mobile robotic machine 114 may represent any type of autonomous robotic machine or apparatus that is capable of performing task 116. In addition, mobile robotic machine 114 may represent a plurality of same and/or different mobile robotic machines. Mobile robotic machine 114 may be, for example, an autonomous vehicle, such as an automobile, sport utility vehicle, van, bus, pickup truck, semi-tractor trailer, or the like, an autonomous aircraft, such as a plane, jet, helicopter, drone, or the like, an autonomous watercraft, such as boat, ship, submarine, and the like, or any other type of autonomous mobile robotic machine or apparatus. Task 116 may be, for example, transporting an item or group of items from one geographic location to another. An item may be, for example, an inanimate object, such as a document, a boxed product, merchandize, bag of groceries, prescription bottle, or the like, or an animate object, such as a person, animal, plant, or the like.

Storage 108 is a network storage device capable of storing any type of data in a structured format or an unstructured format. In addition, storage 108 may represent a plurality of network storage devices. Further, storage 108 may store identifiers and network addresses for a plurality of different servers, identifiers and network addresses for a plurality of different client devices, identifiers and network addresses for a plurality of different mobile robotic machines, identifiers for a plurality of different users, and the like. Furthermore, storage unit 108 may store other types of data, such as authentication or credential data that may include user names, passwords, and biometric data associated with users and system administrators, for example.

In addition, it should be noted that network data processing system 100 may include any number of additional servers, clients, mobile robotic machines, storage devices, and other devices not shown. Program code located in network data processing system 100 may be stored on a computer readable storage medium and downloaded to a computer or other data processing device for use. For example, program code may be stored on a computer readable storage medium on server 104 and downloaded to mobile robotic machine 114 over network 102 for use on mobile robotic machine 114.

In the depicted example, network data processing system 100 may be implemented as a number of different types of communication networks, such as, for example, an internet, an intranet, a local area network (LAN), a wide area network (WAN), a telecommunication network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a permissioned blockchain network node, such as server 104, client 110, or mobile robotic machine 114 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices, such as a hard disk drive, a solid-state drive, a flash memory, a rewritable optical disk, or some combination thereof.

In this example, persistent storage 208 stores task manager 218. However, it should be noted that even though task manager 218 is illustrated as residing in persistent storage 208, in an alternative illustrative embodiment task manager 218 may be a separate component of data processing system 200. For example, task manager 218 may be a hardware component coupled to communication fabric 202 or a combination of hardware and software components.

Task manager 218 utilizes a distributed secure blockchain ledger to allow an autonomous mobile robotic machine to act as an authorized robotic agent during performance of a task by the autonomous mobile robotic machine. The task may be, for example, task 116 in FIG. 1. Task manager 218 maintains known entities in blockchain network 220, which is a list of all member entity nodes connected to a permissioned blockchain network, such as network 102 in FIG. 1. The known entities may be, for example, server 104, server 106, storage 108, client 110, client 112, and mobile robotic machine 114 in FIG. 1. In addition, known entities in blockchain network 220 includes identifiers 222. Each identifier in identifiers 222 uniquely identifies a particular member entity node in the known entities connected to the blockchain network for sharing information via a distributed secure blockchain ledger.

Task manager 218 also maintains policies 224. Policies 224 represents a set of predefined rules corresponding to performance of particular tasks by particular mobile robotic machines. Policies 224 may also define a level of trust required between a particular mobile robotic machine and a particular provider entity while performing a particular task. An entity, such as a user or business, corresponding to data processing system 200 defines policies 224. Of course, policies 224 may represent a plurality of different policies corresponding to a plurality of different users of data processing system 200.

In this example, electronic credentials 226 represent a digital certificate, which identifies the entity corresponding to data processing system 200. However, it should be noted that electronic credentials 226 may also include other types of identifying information corresponding to the entity, such as, for example, electronic driver's license, passport, or the like.

Task manager 218 further maintains blockchain ledger 228. Blockchain ledger 228 represents a secure distributed chronological chain of a plurality of data blocks. Task manager 218 secures blockchain ledger 228 using cryptography. Distributed means that blockchain ledger 228 is transmitted to and shared by all member entity nodes in known entities in blockchain network 220 each time a member entity node appends a new block to blockchain ledger 228.

Blockchain ledger 228 includes block 230. Block 230 represents a single block of data in blockchain ledger 228 and may represent a last or most recent block appended to blockchain ledger 228. In this example, block 230 includes data 232, timestamp 234, and hash 236. However, it should be noted that alternative illustrative embodiments may include more or less information in block 230 than illustrated.

Data 232 may represent any type of information. For example, data 232 may include a record of an event, activity, or operation performed by an entity corresponding to data processing system 200 or a device coupled to data processing system 200. In addition, data 232 may include other types of information, such as, for example, device operation enablement, device operation disablement, device operation restrictions, instructions, invoices, payments, smart contracts, and the like, intended for one or more other member entities or nodes in known entities in blockchain network 220.

Timestamp 234 represents a timestamp of the current time when task manager 218 generated block 230. Task manager 218 generates block 230 upon occurrence of an event, activity, or operation performed by the entity during performance of the task. Alternatively, task manager 218 may generate block 230 at expiration of a predetermined period of time, such as, for example, at five-minute intervals.

Hash 236 represents a cryptographic hash of the immediately preceding block to block 230 in blockchain ledger 228 linking the immediately preceding block to block 230. Task manager 218 may generate hash 236 using, for example, Secure Hash Algorithm 2 (SHA-2), SHA-3, Message Digest 5 (MD5) algorithm, or the like.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Humans exchange information on a daily basis. Frequently, a data exchange is required between humans, usually in close physical proximity, to authenticate themselves and establish who they are. Often this authentication process is performed using a trusted third-party instrument, such as, for example, a driver's license, passport, and other government issued document. With the advent of autonomous mobile robotic machines, such as, for example, any type of unmanned aerial, ground, and marine vehicles representing an extension of internet of things devices, these autonomous mobile robotic machines may act as "agents" for entities, such as, for example, humans or businesses. As an agent, an autonomous mobile robotic machine will need to identify and authenticate itself as an authorized agent of a particular entity to perform a task for that particular entity. For example, if a requesting entity requests an autonomous mobile robotic machine to physically pick up a set of one or more purchased items from a provider entity, such as a retail store or distribution center, the autonomous mobile robotic machine will need to positively identify who the autonomous mobile robotic machine is representing in the transaction and which set of purchased items the autonomous mobile robotic machine was sent to pick up. In addition, the provider entity will need to positively convey to the autonomous mobile robotic machine the set of purchased items being placed in the care of the autonomous mobile robotic machine. An example of this type of transaction may be an autonomous mobile robotic machine picking up an item, such as prescription medication from a pharmacy, a legal document from a law office, or a financial instrument from a financial institution, for a requesting entity. The autonomous mobile robotic machine would need to provide and establish a level of trust with the providing entity and similarly the autonomous mobile robotic machine would need to establish a level of trust that the providing entity is an authenticated provider of the item.

Illustrative embodiments utilize a distributed secure blockchain ledger to form the basis of a transaction allowing an autonomous mobile robotic machine to act as an authorized agent to a provider entity of, for example, goods or services, for a given transaction. The autonomous mobile robotic machine provides trusted, secure confirmation of represented identification of all involved entities via the distributed secure blockchain ledger for each event in the transaction. In addition, the autonomous mobile robotic machine includes cognitive abilities to provide increasingly positive task performance outcomes. In other words, the autonomous mobile robotic machine learns over time by identifying best identity exchange practices and mutual preferences for both the requesting entity and the providing entity. For example, the autonomous mobile robotic machine identifies the required level of trust and best geographic location and time for a task to be performed. Further, the autonomous mobile robotic machine learns frequently used and preferred provider entities of goods and services corresponding to particular tasks. Furthermore, the autonomous mobile robotic machine determines order of events for the particular tasks. Moreover, the autonomous mobile robotic machine determines task performance time estimates based on geographic location and historical time requirements for each particular task. The autonomous mobile robotic machine also utilizes multi-level, trust-based authentication for different tasks. For example, an autonomous mobile robotic machine may require a lower-level of authentication for a task that involves picking up a load of bread at a grocery store and require a higher-level of authentication for picking up a prescription at a pharmacy.

The autonomous mobile robotic machine may also return an item to a provider entity in a similar manner. In addition, the autonomous mobile robotic machine may present itself for inspection, repair, or maintenance when the autonomous mobile robotic machine is an autonomous unmanned ground vehicle, such as a car, for example. The autonomous mobile robotic machine may also provide passenger or luggage pre-check in drop off and pick up tasks. Further, positive identification of an autonomous mobile robotic machine (e.g., an unmanned conveyance vehicle, such as a school bus) via the distributed secure blockchain ledger would allow a school system, for example, to transfer students to the autonomous mobile robotic machine and have proof of student conveyance. This transfer of students could be securely monitored, via the blockchain ledger (e.g., by a parent of a student), to make sure that the students are being transported safely by the school system to their homes. Furthermore, an autonomous mobile robotic machine may act on behalf of multiple entities at a same time. Moreover, the autonomous mobile robotic machine may receive and interpret voice commands for performing a plurality of tasks.

The autonomous mobile robotic machine determines parameters, such as, for example, who, what, when, and where, corresponding to each particular task, accesses information related to each respective task, such as price comparison data and preferred providers, prioritizes tasks based on urgency or need, considers environmental data, such as weather and traffic conditions and time of day, estimates task wait time or availability to determine itinerary for multiple tasks, checks hours of operation of provider entities as compared to estimated travel time and task duration, and verifies task performance by, for example, RFID tag reader, bar code scanner, optical reader, or the like. The autonomous mobile robotic machine may include receptacles or compartments to receive items for transport. Further, the autonomous mobile robotic machine may include a mechanical component for filling and emptying the receptacles or compartments of the autonomous mobile robotic machine.

The autonomous mobile robotic machine records and tracks outcomes for each performed task. The autonomous mobile robotic machine utilizes detected trends in the records to generate optimized plans when performing current tasks. The autonomous mobile robotic machine may also utilize a machine learning service to determine best prices, fastest service location, and the like. Further, the autonomous mobile robotic machine knows which geographic locations corresponding to provider entities accept autonomous mobile robotic machines.

Illustrative embodiments establish a chain of custody for an item transported by an autonomous mobile robotic machine via the distributed secure blockchain ledger. An Item may be, for example, a legal document, prescription medication, groceries, or person, such as a child. A trusted entity in the blockchain network, such as, for example, a certification authority, issues each entity in the blockchain network a digital certificate. A digital certificate uniquely identifies each respective entity in the blockchain network. When an entity requests that a task be performed, such as employing an unmanned aerial vehicle to transport an item, the requesting entity requests that an available unmanned aerial vehicle complete the task. Subsequently, an unmanned aerial vehicle accepts the task and the requesting entity receives a task acceptance notification.

The unmanned aerial vehicle may share task performance plan details with the requesting entity for feedback regarding details of the plan. In addition, the requesting entity derives a digital certificate for the unmanned aerial vehicle and signs the derived digital certificate using the digital certificate of the requesting entity. This digital certificate signature of the requesting entity provides an indication that the unmanned aerial vehicle is authorized by the requesting entity to perform the task (e.g., transport the item). Illustrative embodiments post the public key corresponding to the digital certificate of the unmanned aerial vehicle to the permissioned blockchain network. This posting of the public key enables other blockchain network member entities responsible for the item to use the public key to confirm authorization of the unmanned aerial vehicle before providing the item to the unmanned aerial vehicle for transport. As a result, illustrative embodiments enable tracking of the chain of custody of the item using the distributed secure blockchain ledger viewable by the member entities within the blockchain network.

To start the process, the requesting entity, uniquely identified through a buyer identifier and digital certificate, places an order for the item at a store owned by a provider entity, uniquely identified through a seller identifier and digital certificate. In one illustrative embodiment, execution of the financial transaction corresponding to the order is governed using a blockchain ledger smart contract. As the order is prepared, the requesting entity requests transport of the item using an available unmanned aerial vehicle. In another illustrative embodiment, the requesting entity utilizes an unmanned aerial vehicle owned by the requesting entity to complete the task of transporting the item. The provider entity authenticates the signed digital certificate of the unmanned aerial vehicle using the public key of the signed digital certificate, which was previously made available to the blockchain network, and hands over the item to the unmanned aerial vehicle for transport. Finally, the unmanned aerial vehicle delivers the item to the requesting entity. Once the requesting entity validates receipt of the item, the smart contract triggers the financial transaction. In the event that an autonomous mobile robotic machine is assigned multiple tasks, the autonomous mobile robotic machine prioritizes the tasks based on multiple factors considering preferences of each requesting entity.

Figure 3A:
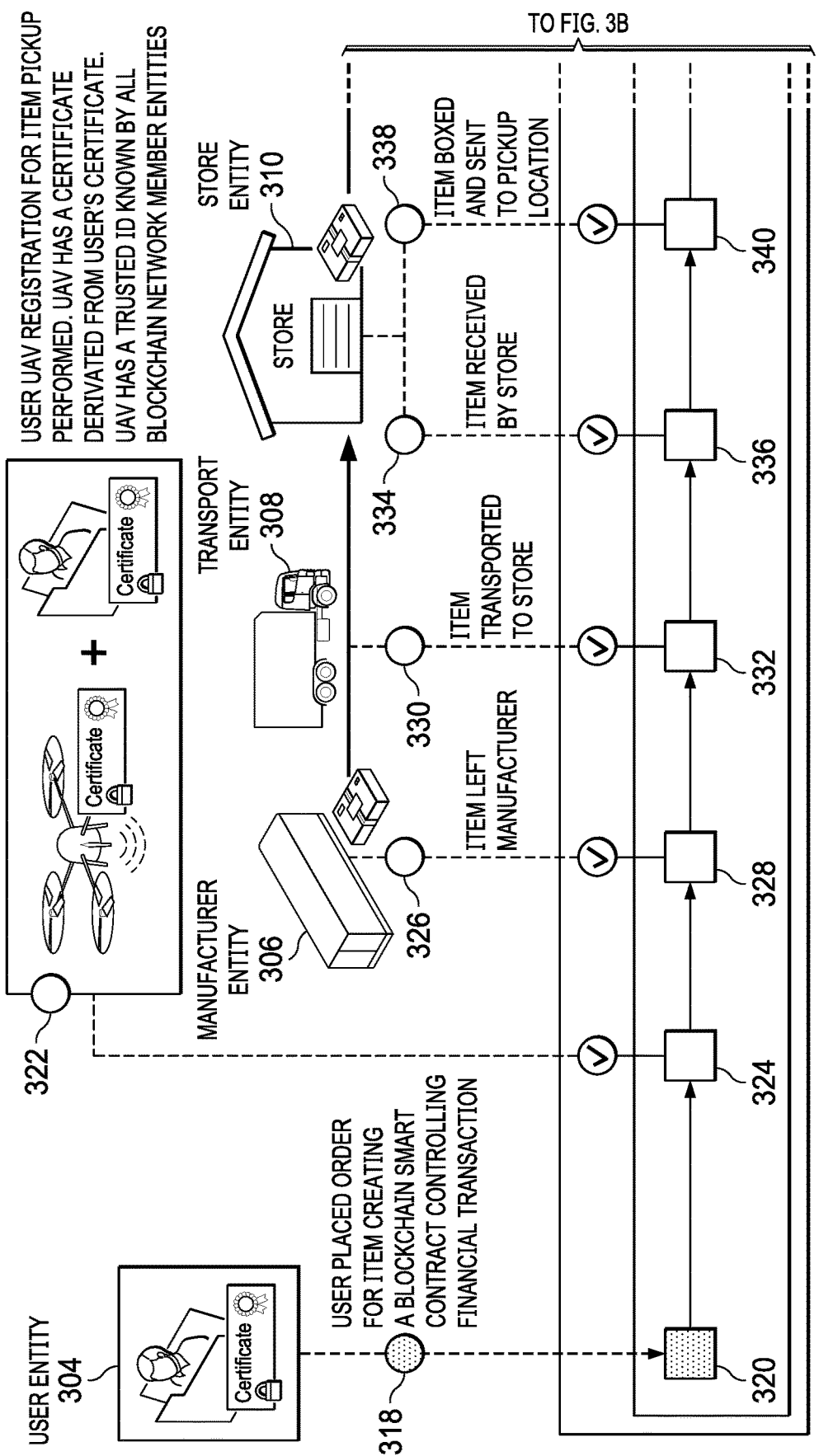
FIGS. 3A-3B are a diagram illustrating a task management system in accordance with an illustrative embodiment.
Figure 3B:
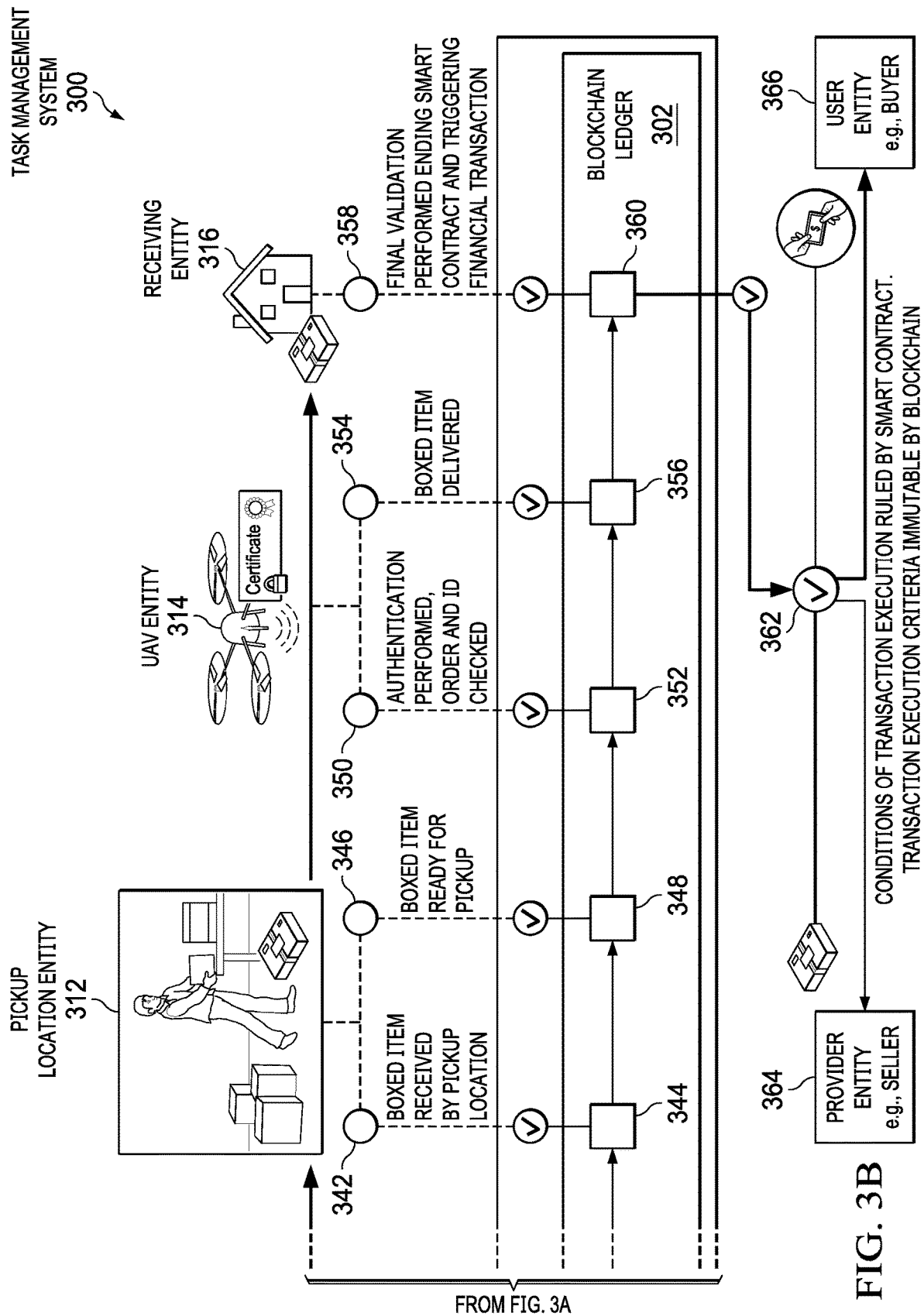

With reference now to FIGS. 3A-3B, a diagram illustrating an example of a task management system is depicted in accordance with an illustrative embodiment. Task management system 300 may be implemented in a network of data processing systems, such as network data processing system 100 in FIG. 1. Task management system 300 is a system of hardware and software components for utilizing a distributed secure blockchain ledger to form a basis for allowing an autonomous mobile robotic machine to act as a requesting entity authorized robotic agent to a provider entity during performance of a task by the autonomous mobile robotic machine.

In this example, task management system 300 includes blockchain ledger 302, user entity 304, manufacturer entity 306, transport entity 308, store entity 310, pickup location entity 312, mobile robotic machine entity 314, and receiving entity 316. In this example, user entity 304 is a person and is the requesting entity. At 318, user entity 304 places an order for an item, such as, for example, a tablet computer, which creates a blockchain smart contract controlling the financial transaction. A data processing device corresponding to user entity 304 records the order and blockchain smart contract in block 320 of blockchain ledger 302. Block 320 of blockchain ledger 302 may be, for example, block 230 of blockchain ledger 228 in FIG. 2.

At 322, user entity 304 performs a registration of unmanned aerial vehicle entity 314 for performing the task of picking up, transporting, and dropping off the item. Unmanned aerial vehicle entity 314 may be, for example, mobile robotic machine 114 in FIG. 1. The data processing device corresponding to user entity 304 derives a digital certificate for unmanned aerial vehicle entity 314 from a digital certificate of user entity 304 and signs the digital certificate of unmanned aerial vehicle entity 314 using the digital certificate of user entity 304. In addition, unmanned aerial vehicle entity 314 has a trusted identification known by all blockchain network member entities. The data processing device corresponding to user entity 304 posts the registration and public key corresponding to the signed digital certificate of unmanned aerial vehicle entity 314 in block 324 of blockchain ledger 302.

At 326, a data processing device corresponding to manufacturer entity 306 records that the item left the manufacturer in block 328 of blockchain ledger 302. At 330, a data processing device corresponding to transport entity 308 records that the item was transported to store entity 310 in block 332 of blockchain ledger 302. At 324, a data processing device corresponding to store entity 310 records that the item was received by the store in block 336 of blockchain ledger 302. At 338, the data processing device corresponding to store entity 310 also records that the item was boxed and sent to a pickup location in block 340 of blockchain ledger 302.

At 342, a data processing device corresponding to pick up location entity 312 records that the boxed item was received at the pickup location in block 344 of blockchain ledger 302. At 346, the data processing device corresponding to pick up location entity 312 also records that the boxed item is ready for pick up in block 348 of blockchain ledger 302. At 350, the data processing device corresponding to unmanned aerial vehicle entity 314 performs authentication based on the determined level of trust required for the task of transporting the boxed item, checks the order and item identifiers, and picks up and transports the boxed item based on positive authentication and identifier checks. The data processing device corresponding to unmanned aerial vehicle entity 314 records the authentication, pick up, and transport of the boxed item in block 352 of blockchain ledger 302. At 354, the data processing device corresponding to unmanned aerial vehicle entity 314 records that the boxed item was delivered to the specified location in block 356 of blockchain ledger 302.

At 358, receiving entity 316 performs a final validation that the boxed item was received ending the smart contract and triggering the financial transaction. It should be noted that receiving entity 316 may be the same as user entity 304 or a different member entity of the permissioned blockchain network. A data processing device corresponding to receiving entity 316 records the final validation in block 360 of blockchain ledger 302. At 362, conditions of transaction execution are ruled by the smart contract and the transaction execution criteria are immutable via blockchain ledger 302 between provider entity 364 and user entity 366. Provider entity 364 is the seller of the item and may be, for example, manufacturer entity 306 or store entity 310. User entity 366 is the buyer of the item and is the same as user entity 304.

Figure 4:
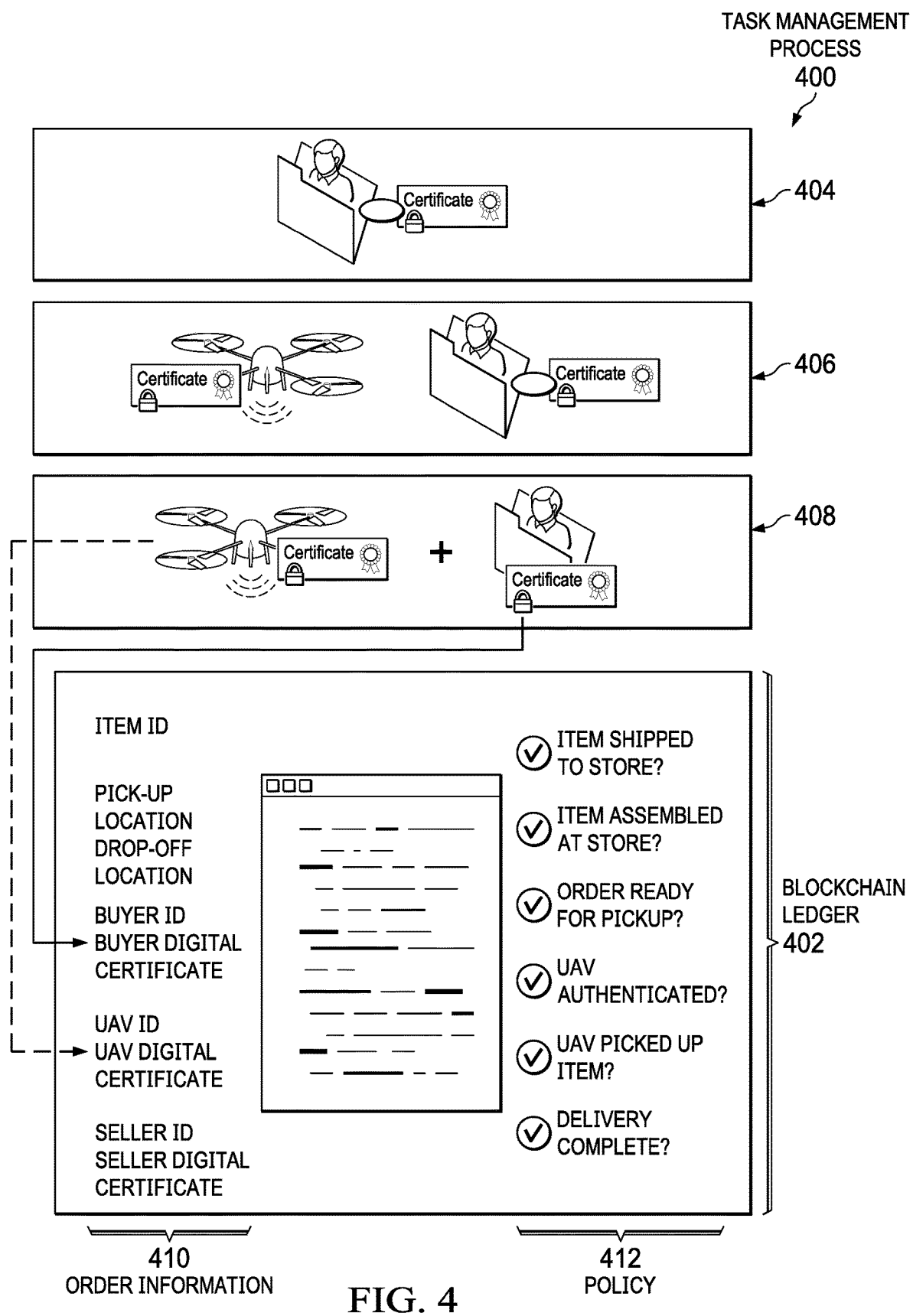
FIG. 4 is a diagram illustrating an example of a task management process in accordance with an illustrative embodiment.

With reference now to FIG. 4, a diagram illustrating an example of a task management process is depicted in accordance with an illustrative embodiment. Task management process 400 may be implemented in a task management system, such as, for example, task management system 300 in FIGS. 3A-3B. Task management process 400 includes blockchain ledger 402, such as, for example, blockchain ledger 302 in FIGS. 3A-3B.

At 404, a buyer (i.e., a requesting entity) has a unique identifier associated with a digital certificate provided by a trusted entity, such as a certification authority. The digital certificate guarantees proof of identity of the buyer. At 406, the buyer requests that an autonomous mobile robotic machine, such as an unmanned aerial vehicle, physically pick up, transport, and drop off one or more purchased items from a retail store or distribution center. To ensure the required level of trust during authentication between the unmanned aerial vehicle and the selling entity, the buyer generates a digital certificate for the unmanned aerial vehicle and signs the generated digital certificate of the unmanned aerial vehicle with the digital certificate of the buyer. The buyer shares the public key corresponding to the signed digital certificate of the unmanned aerial vehicle with the member entities of the permissioned blockchain network. As a result, each member entity is able to authenticate the unmanned aerial vehicle acting as a robotic agent of the buyer.

At 408, the buyer registers the unmanned aerial vehicle and sends the unmanned aerial vehicle to pick up the purchased items. Blockchain ledger 402 includes order information 410 and policy 412. Order information 410 ensures that the registered unmanned aerial vehicle is able to pick up the purchased items according to a valid order. In other words, the unmanned vehicle utilizes order information 410 to verify the purchased items to be picked up and perform the authentication process with the seller entity. In this example, order information 410 includes item identification, pick up location, drop off location, buyer identifier and digital certificate, unmanned aerial vehicle identifier and digital certificate, and seller identifier and digital certificate.

Policy 412 is a set of rules that control the unmanned aerial vehicle delivery process, which is known by all member entities of the permissioned blockchain network, and is immutable and traceable via blockchain ledger 402. In this example, policy 412 includes "items shipped to store?", "order assembled at store?", "order ready for pickup?", "unmanned aerial vehicle authenticated?", "unmanned aerial vehicle pickup?", and "delivery to buyer complete?". However, it should be noted that policy 412 is only meant as an example and not as a limitation on illustrative embodiments. In other words, policy 412 may include any number and type of rules to control a task.

Figure 5:
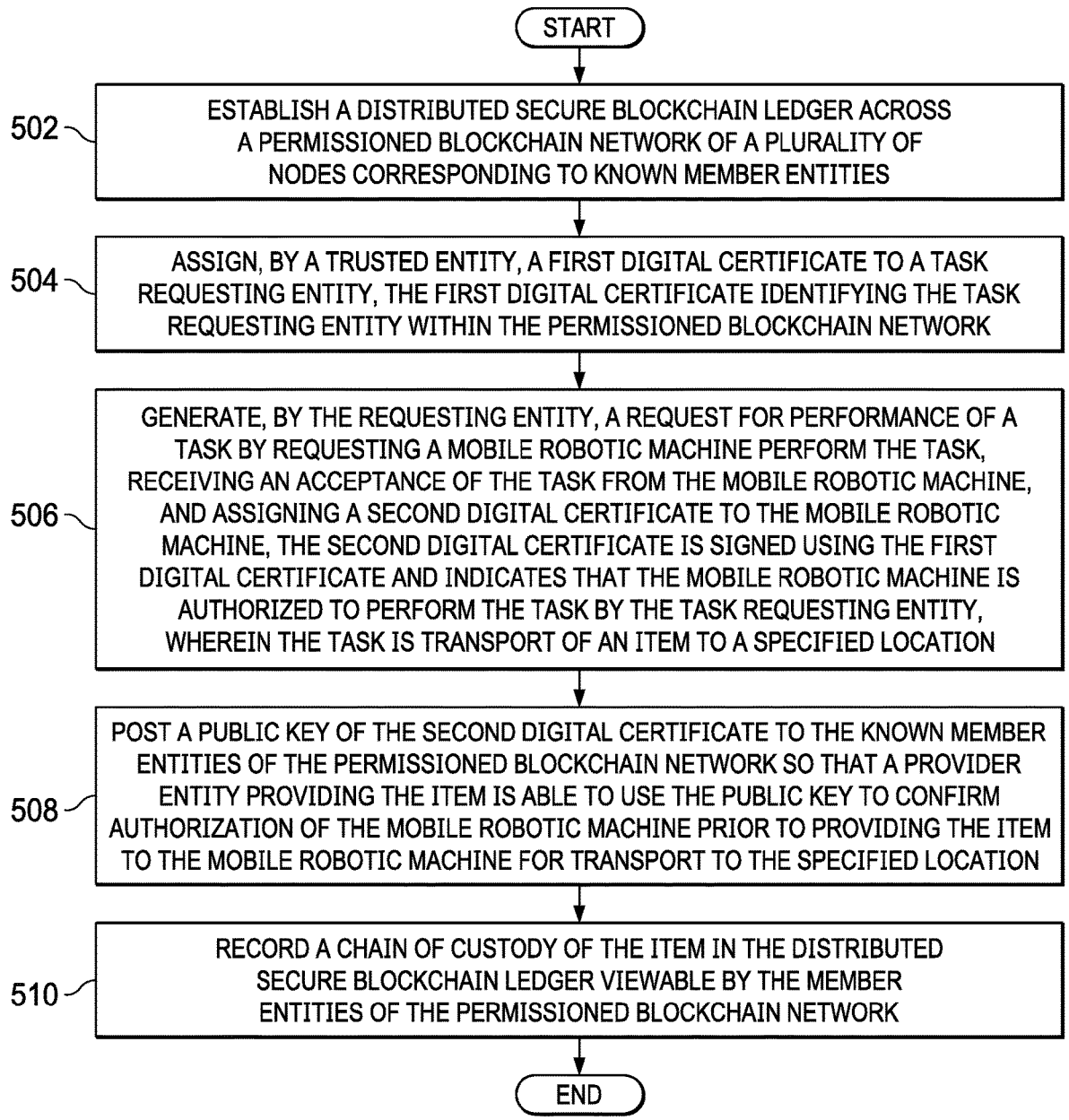
FIG. 5 is a flowchart illustrating a process for establishing a chain of custody of an item in accordance with an illustrative embodiment.

With reference now to FIG. 5, a flowchart illustrating a process for establishing a chain of custody of an item is shown in accordance with an illustrative embodiment. The process shown in FIG. 5 may be implemented in a network data processing system, such as, for example, network data processing system 100 in FIG. 1.

The process begins when the network data processing system establishes a distributed secure blockchain ledger across a permissioned blockchain network of a plurality of nodes corresponding to known member entities (step 502). The distributed secure blockchain ledger may be, for example, blockchain ledger 228 in FIG. 2, blockchain ledger 302 in FIGS. 3A-3B, or blockchain ledger 402 in FIG. 4. The permissioned blockchain network may be, for example, network 102 in FIG. 1.

Illustrative embodiments establish a blockchain fabric, blockchain code, and user interface between all data processing nodes of the permissioned blockchain network. Data processing nodes within the permissioned blockchain network may be found in, for example, autonomous vehicles, such as automobiles, vans, buses, trucks, semis, and the like, autonomous aircraft, such as planes, jets, helicopters, drones, and the like, autonomous watercraft, such as boats, ships, submarines, and the like, and any other type of autonomous mobile robotic machine or apparatus; or corresponding to, for example, member entities, such as requesting entities, providing entities, item processing entities, and the like, within the permissioned blockchain network.

A data processing node corresponding to a trusted entity of the permissioned blockchain network assigns a first digital certificate to a task requesting entity (step 504). The task requesting entity may be, for example, user entity 304 in FIG. 3A. The first digital certificate identifies the task requesting entity within the permissioned blockchain network.

A data processing node corresponding to the requesting entity generates a request for performance of a task (step 506). The data processing node corresponding to the requesting entity generates the request for performance of the task by requesting a mobile robotic machine perform the task, receiving an acceptance of the task from the mobile robotic machine, and assigning a second digital certificate to the mobile robotic machine. The data processing node corresponding to the requesting entity signs the second digital certificate using the first digital certificate, which indicates that the mobile robotic machine is authorized to perform the task by the task requesting entity. The task is transport of an item to a specified location.

The data processing node corresponding to the requesting entity posts a public key of the second digital certificate to the known member entities of the permissioned blockchain network so that a provider entity providing the item is able to use the public key to confirm authorization of the mobile robotic machine prior to providing the item to the mobile robotic machine for transport to the specified location (step 508). The network data processing system records a chain of custody of the item in the distributed secure blockchain ledger viewable by the member entities of the permissioned blockchain network (step 510). Thereafter, the process terminates.

Figure 6:
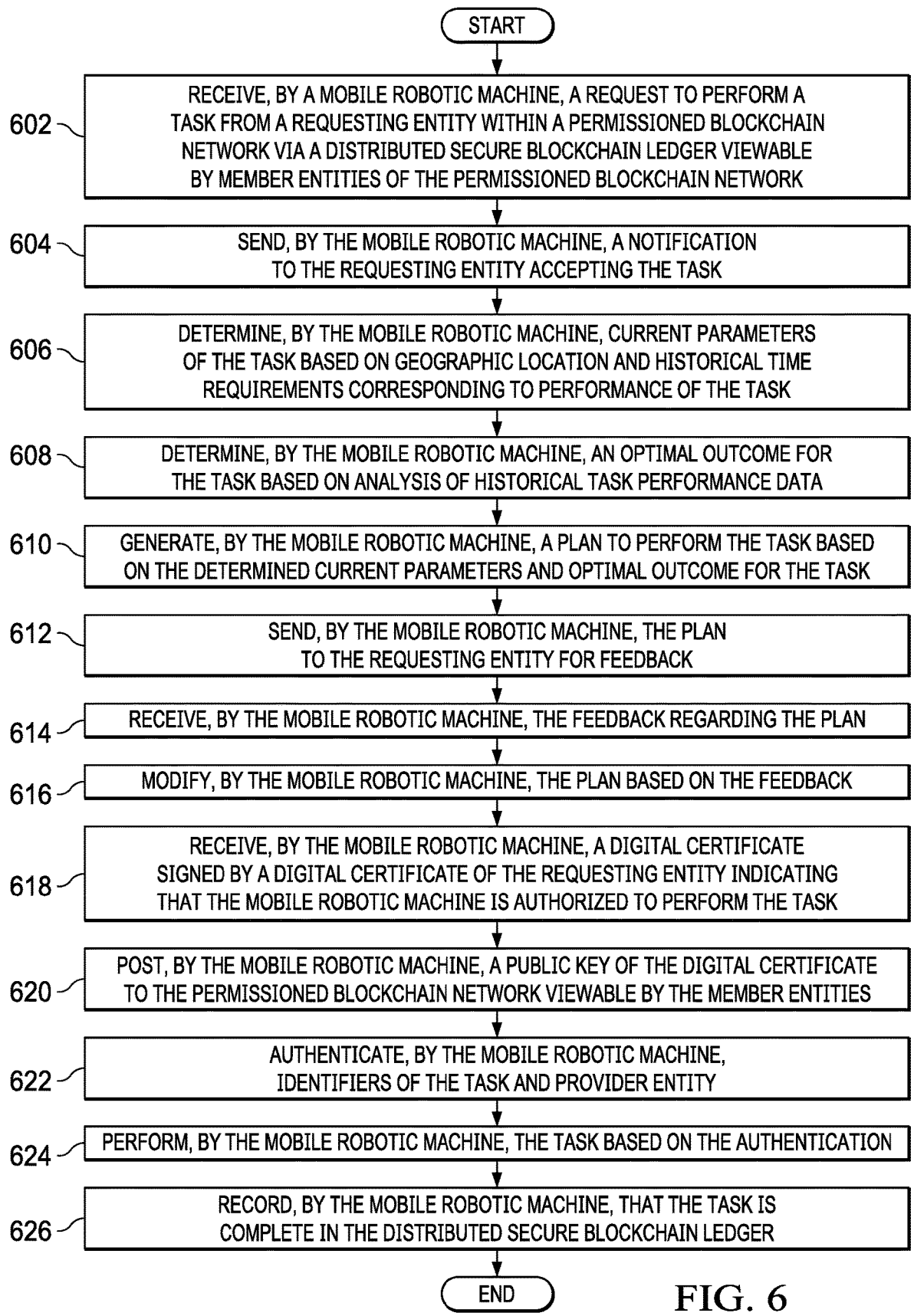
FIG. 6 is a flowchart illustrating a process for a mobile robotic machine in accordance with an illustrative embodiment.

With reference now to FIG. 6, a flowchart illustrating a process for a mobile robotic machine is shown in accordance with an illustrative embodiment. The process shown in FIG. 6 may be implemented in a mobile robotic machine, such as, for example, mobile robotic machine 114 in FIG. 1, data processing system 200 in FIG. 2, or unmanned aerial vehicle entity 314 in FIG. 3B.

The process begins when the mobile robotic machine receives a request to perform a task from a requesting entity within a permissioned blockchain network via a distributed secure blockchain ledger viewable by member entities of the permissioned blockchain network (step 602). The requesting entity may be, for example, user entity 304 in FIG. 3A. The mobile robotic machine sends a notification to the requesting entity accepting the task (step 604).

The mobile robotic machine also determines current parameters of the task based on geographic location and historical time requirements corresponding to performance of the task (step 606). In addition, the mobile robotic machine determines an optimal outcome for the task based on analysis of historical task performance data (step 608). Afterward, the mobile robotic machine generates a plan to perform the task based on the determined current parameters and optimal outcome for the task (step 610).

Subsequently, the mobile robotic machine sends the plan to the requesting entity for feedback (step 612). The mobile robotic machine receives the feedback regarding the plan (step 614). The mobile robotic machine modifies the plan based on the feedback (step 616).

Further, the mobile robotic machine receives a digital certificate signed by a digital certificate of the requesting entity indicating that the mobile robotic machine is authorized to perform the task (step 618). The mobile robotic machine posts a public key of the digital certificate to the permissioned blockchain network viewable by the member entities (step 620). Moreover, the mobile robotic machine authenticates identifiers of the task and provider entity (step 622).

Then, the mobile robotic machine performs the task based on the authentication (step 624). In addition, the mobile robotic machine records that the task is complete in the distributed secure blockchain ledger (step 626). Thereafter, the process terminates.

Figure 7:
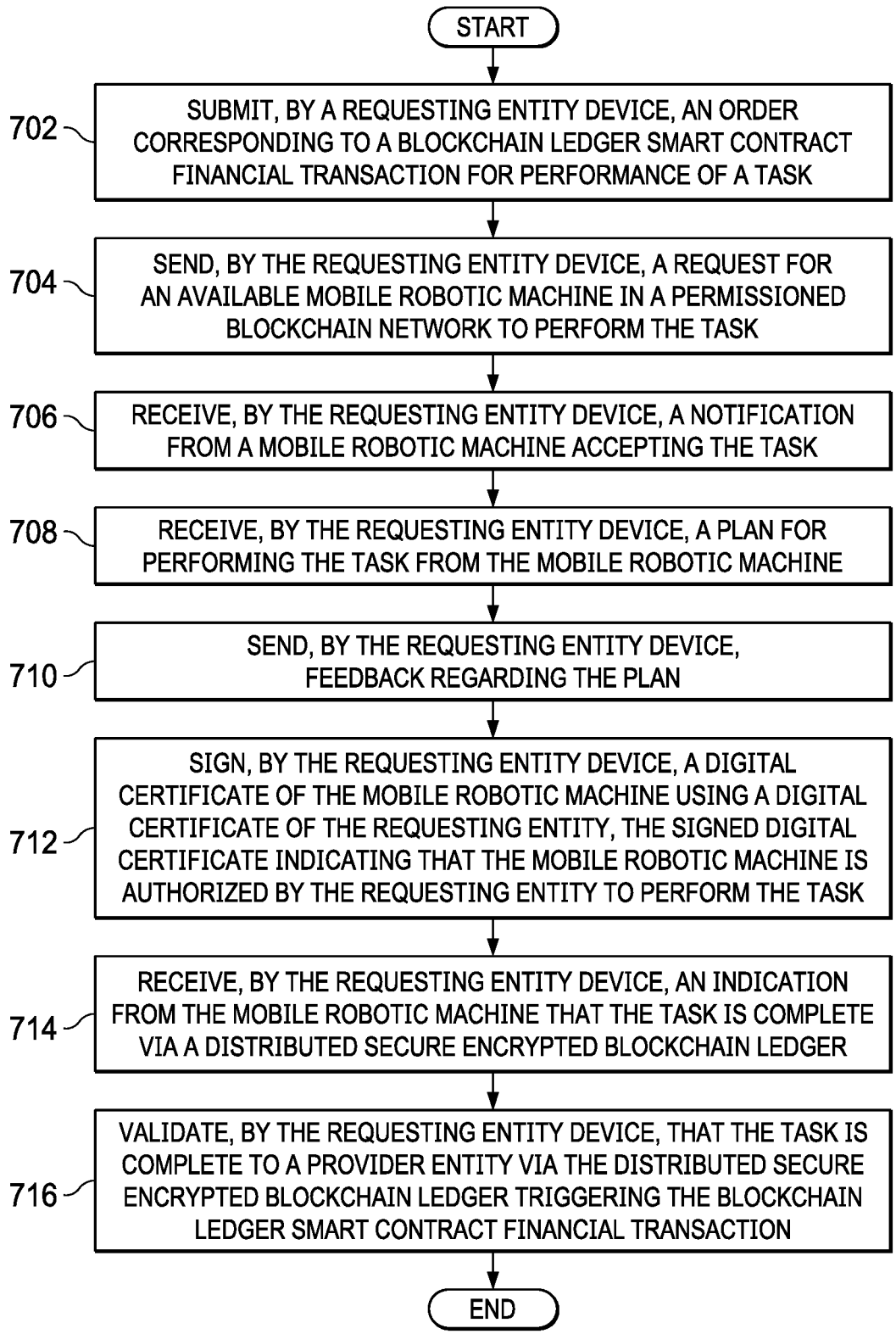
FIG. 7 is a flowchart illustrating a process for a requesting entity device in accordance with an illustrative embodiment.

With reference now to FIG. 7 is a flowchart illustrating a process for a requesting entity device in accordance with an illustrative embodiment. The process shown in FIG. 7 may be implemented in a requesting entity device, such as, for example, client 110 in FIG. 1, data processing system 200 in FIG. 2, or a data processing system corresponding to user entity 304 in FIG. 3A.

The process begins when the requesting entity device submits an order corresponding to a blockchain ledger smart contract financial transaction for performance of a task (step 702). In addition, the requesting entity device sends a request for an available mobile robotic machine in a permissioned blockchain network to perform the task (step 704). The requesting entity device receives a notification from a mobile robotic machine accepting the task (step 706).

Further, the requesting entity device receives a plan for performing the task from the mobile robotic machine (step 708). In response, the requesting entity device sends feedback regarding the plan (step 710). The requesting entity device also signs a digital certificate of the mobile robotic machine using a digital certificate of the requesting entity (step 712). The signed digital certificate indicates that the mobile robotic machine is authorized by the requesting entity to perform the task.

Subsequently, the requesting entity device receives an indication from the mobile robotic machine that the task is complete via a distributed secure encrypted blockchain ledger (step 714). Afterward, the requesting entity device validates that the task is complete to a provider entity via the distributed secure encrypted blockchain ledger triggering the blockchain ledger smart contract financial transaction (step 716). Thereafter, the process terminates.

Thus, illustrative embodiments of the present invention provide a computer-implemented method, computer system, and computer program product for utilizing a distributed secure blockchain ledger to form a basis for allowing an autonomous mobile robotic machine to act as an authorized robotic agent of a requesting entity to a provider entity during performance of a task by the autonomous mobile robotic machine. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for utilizing blockchain ledgers with mobile robotic machines, the method comprising:
    assigning, by a trusted entity, a first digital certificate to a requesting entity, wherein the first digital certificate identifies the requesting entity within a network;
    generating, by the requesting entity, a request for performance of a task by a mobile robotic machine, wherein the generating of the request includes:
        requesting the mobile robotic machine to perform the task;
        receiving an acceptance of the task from the mobile robotic machine; and assigning a second digital certificate to the mobile robotic machine, wherein the second digital certificate is signed using the first digital certificate and indicates that the mobile robotic machine is authorized to perform the task;

posting, by the mobile robotic machine, a public key of the second digital certificate signed using the first digital certificate and assigned to the mobile robotic machine to member entities of the network, whereby other member entities responsible for an item corresponding to the task are able to use the public key of the second digital certificate signed using the first digital certificate and assigned to the mobile robotic machine to confirm authorization of the mobile robotic machine to perform the task as an agent for the requesting entity;

performing, by the mobile robotic machine, authentication of identifiers of the task and a provider entity;

performing, by the mobile robotic machine, the task based on the authentication of the identifiers of the task and the provider entity; and recording, by the mobile robotic machine, a chain of custody of the item corresponding to the task in a distributed secure blockchain ledger viewable by the member entities of the network.

2. The method of claim 1 further comprising:
establishing the distributed secure blockchain ledger across the network of a plurality of nodes corresponding to the member entities.

3. The method of claim 1 further comprising:
determining, by the mobile robotic machine, current parameters of the task based on geographic location and historical time requirements corresponding to performance of the task;
determining, by the mobile robotic machine, an optimal outcome for the task based on analysis of historical task performance data; and
generating, by the mobile robotic machine, a plan to perform the task based on determined current parameters and optimal outcome for the task.

4. The method of claim 3 further comprising:
sending, by the mobile robotic machine, the plan to the requesting entity for feedback;
receiving, by the mobile robotic machine, the feedback regarding the plan; and
modifying, by the mobile robotic machine, the plan based on the feedback.

5. The method of claim 1 further comprising:
validating, by the requesting entity, that the task is complete via the distributed secure blockchain ledger triggering a smart contract financial transaction.

6. The method of claim 1, wherein the task is transport of the item to a specified location.

7. The method of claim 1, wherein the network is a permissioned blockchain network.

8. A network data processing system for utilizing blockchain ledgers with mobile robotic machines, the network data processing system comprising:
a bus system;
a storage device connected to the bus system, wherein the storage device stores program instructions; and
one or more processors connected to the bus system, wherein the one or more processors executes the program instructions to:
assign a first digital certificate to a requesting entity, wherein the first digital certificate identifies the requesting entity within a network;

generate a request for performance of a task by a mobile robotic machine, wherein generate the request includes:
request the mobile robotic machine to perform the task;
receive an acceptance of the task from the mobile robotic machine; and
assign a second digital certificate to the mobile robotic machine, wherein the second digital certificate is signed using the first digital certificate and indicates that the mobile robotic machine is authorized to perform the task;

post a public key of the second digital certificate signed using the first digital certificate and assigned to the mobile robotic machine to member entities of the network, whereby other member entities responsible for an item corresponding to the task are able to use the public key of the second digital certificate signed using the first digital certificate and assigned to the mobile robotic machine to confirm authorization of the mobile robotic machine to perform the task as an agent for the requesting entity;

perform authentication of identifiers of the task and a provider entity;

perform the task based on the authentication of the identifiers of the task and the provider entity; and record a chain of custody of the item corresponding to the task in a distributed secure blockchain ledger viewable by the member entities of the network.

9. The network data processing system of claim 8, wherein the one or more processors further execute the program instructions to:
establish the distributed secure blockchain ledger across the network of a plurality of nodes corresponding to the member entities.

10. The network data processing system of claim 8, wherein the one or more processors further execute the program instructions to:
determine current parameters of the task based on geographic location and historical time requirements corresponding to performance of the task;
determine an optimal outcome for the task based on analysis of historical task performance data; and
generate a plan to perform the task based on determined current parameters and optimal outcome for the task.

11. A computer program product for utilizing blockchain ledgers with mobile robotic machines, the computer program product comprising a non-transitory computer readable storage medium having program instructions embodied therewith, the program instructions executable by one or more processors to cause the one or more processors to perform a method comprising:
assigning, by a trusted entity, a first digital certificate to a requesting entity, wherein the first digital certificate identifies the requesting entity within a network;
generating, by the requesting entity, a request for performance of a task by a mobile robotic machine, wherein the generating of the request includes:
requesting the mobile robotic machine to perform the task;
receiving an acceptance of the task from the mobile robotic machine; and
assigning a second digital certificate to the mobile robotic machine, wherein the second digital certificate is signed using the first digital certificate and indicates that the mobile robotic machine is authorized to perform the task;

posting, by the mobile robotic machine, a public key of the second digital certificate signed using the first digital certificate and assigned to the mobile robotic machine to member entities of the network, whereby other member entities responsible for an item corresponding to the task are able to use the public key of the second digital certificate signed using the first digital certificate and assigned to the mobile robotic machine to confirm authorization of the mobile robotic machine to perform the task as an agent for the requesting entity;

performing, by the mobile robotic machine, authentication of identifiers of the task and a provider entity;

performing, by the mobile robotic machine, the task based on the authentication of the identifiers of the task and the provider entity; and recording, by the mobile robotic machine, a chain of custody of the item corresponding to the task in a distributed secure blockchain ledger viewable by the member entities of the network.

12. The computer program product of claim 11 further comprising:

establishing the distributed secure blockchain ledger across the network of a plurality of nodes corresponding to the member entities.

13. The computer program product of claim 11 further comprising:

determining, by the mobile robotic machine, current parameters of the task based on geographic location and historical time requirements corresponding to performance of the task;

determining, by the mobile robotic machine, an optimal outcome for the task based on analysis of historical task performance data; and generating, by the mobile robotic machine, a plan to perform the task based on determined current parameters and optimal outcome for the task.

14. The computer program product of claim 13 further comprising:

sending, by the mobile robotic machine, the plan to the requesting entity for feedback;

receiving, by the mobile robotic machine, the feedback regarding the plan; and modifying, by the mobile robotic machine, the plan based on the feedback.

15. The computer program product of claim 11 further comprising:

validating, by the requesting entity, that the task is complete via the distributed secure blockchain ledger triggering a smart contract financial transaction.

* * * * *